Sept. 6, 1960 N. I. BOHLIN 2,951,420
EJECTION GUN FOR AIRCRAFT EJECTION SEAT
Filed Oct. 12, 1956 5 Sheets-Sheet 1

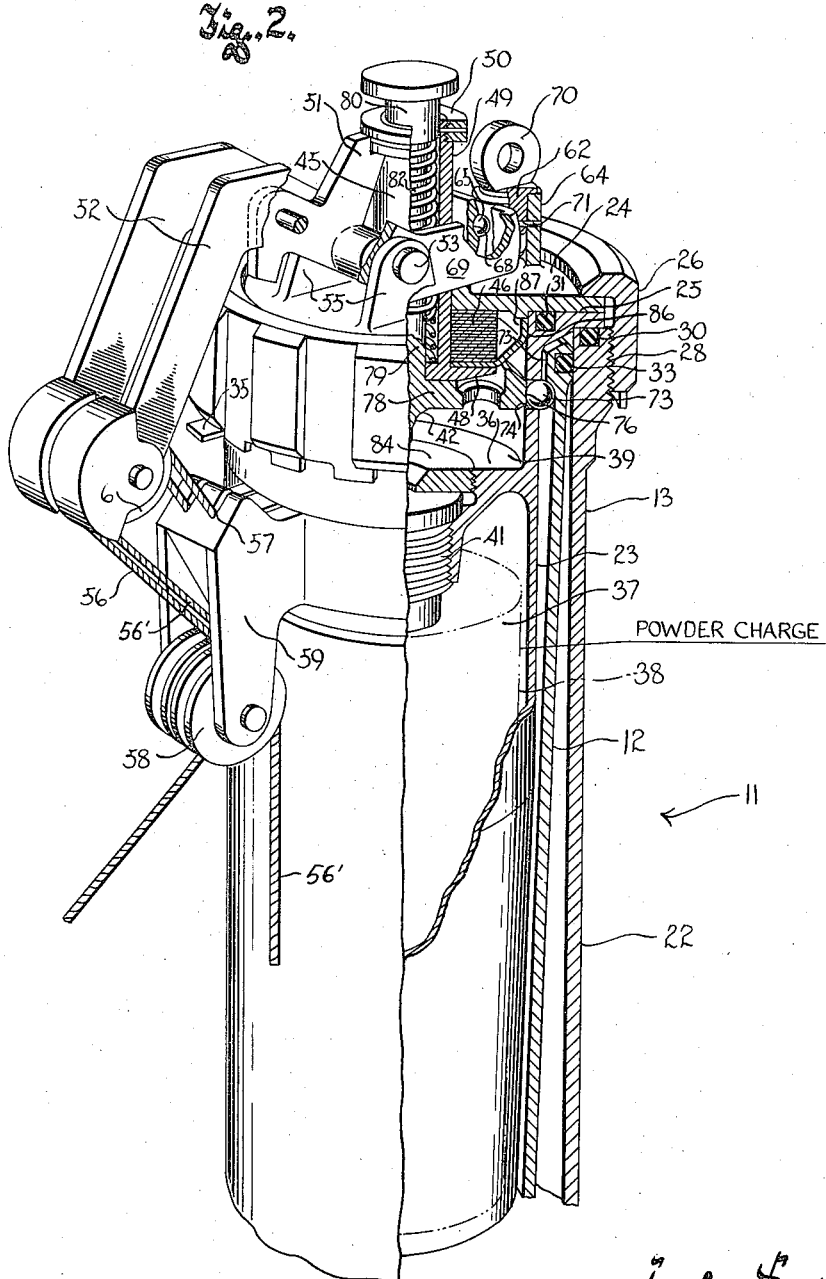

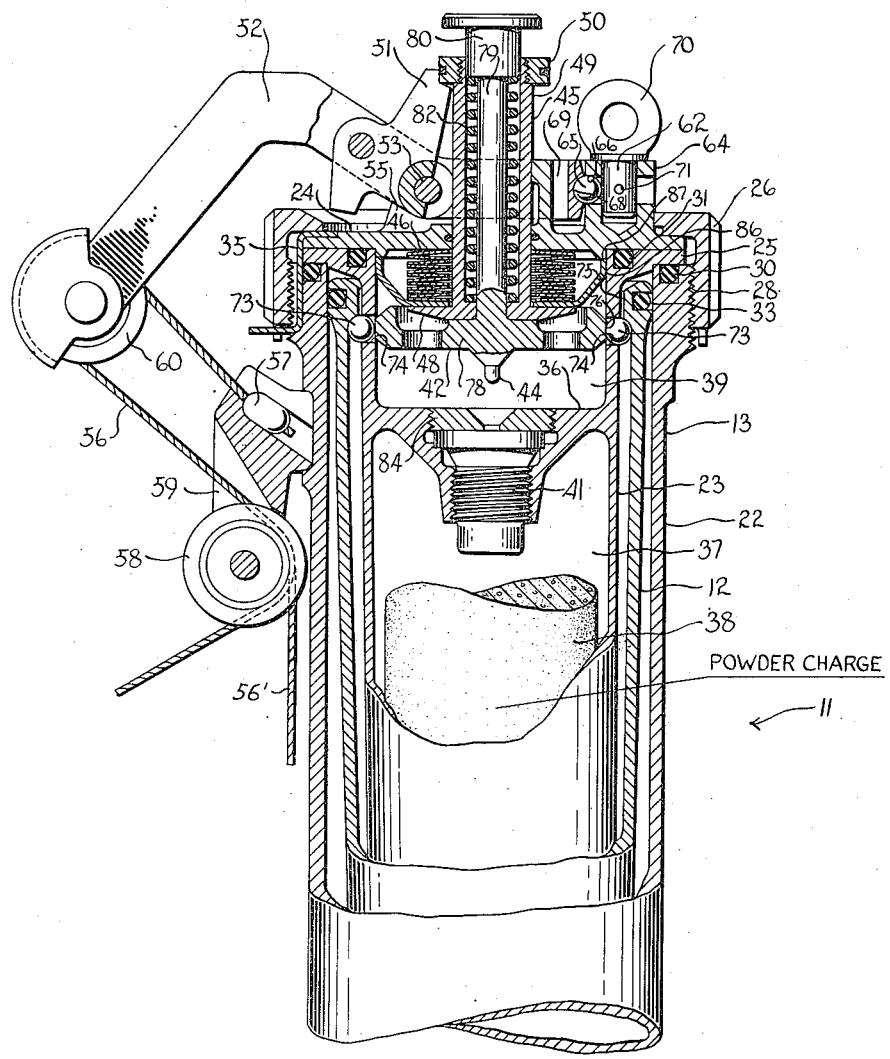

Sept. 6, 1960          N. I. BOHLIN          2,951,420
EJECTION GUN FOR AIRCRAFT EJECTION SEAT
Filed Oct. 12, 1956          5 Sheets-Sheet 4
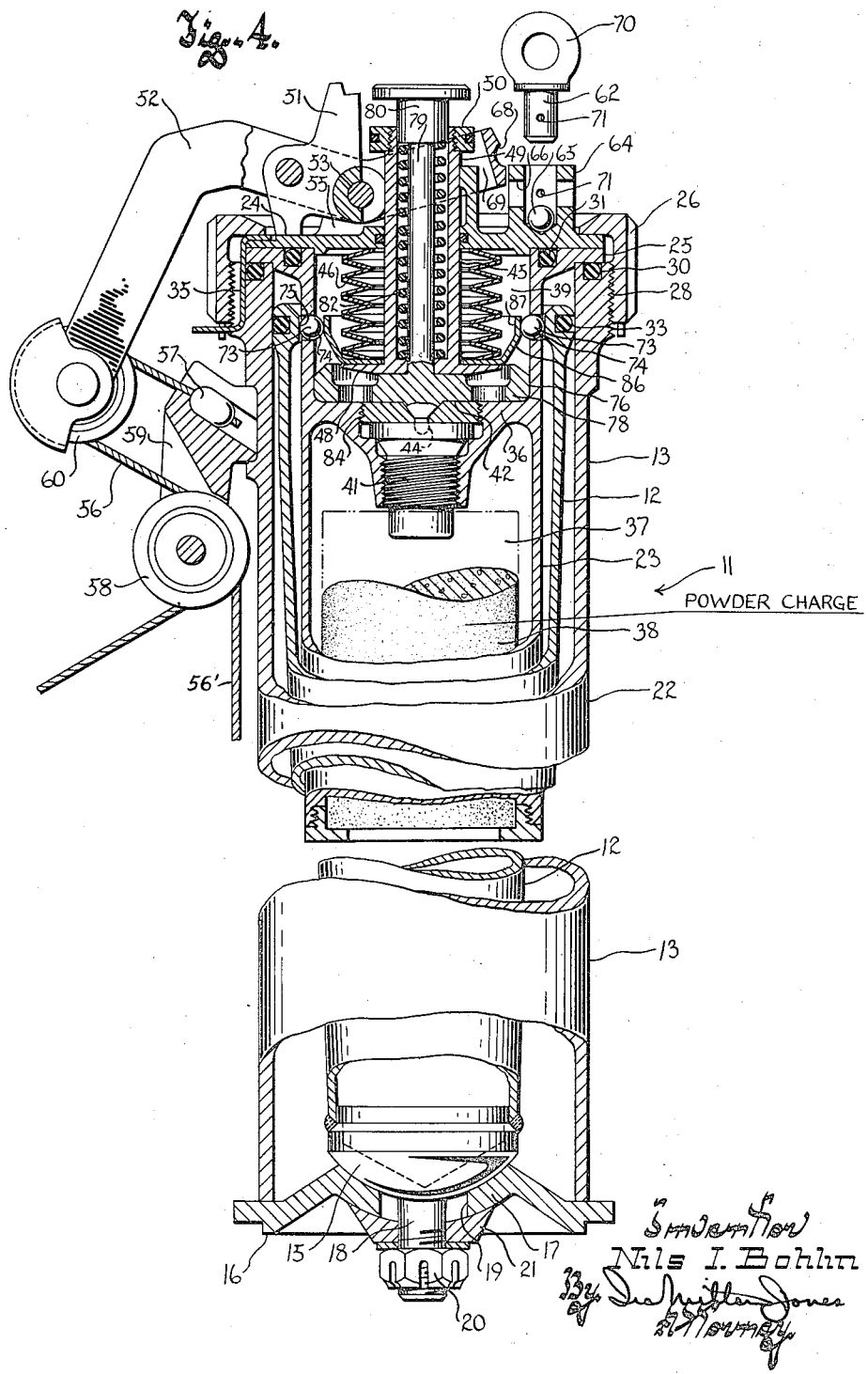

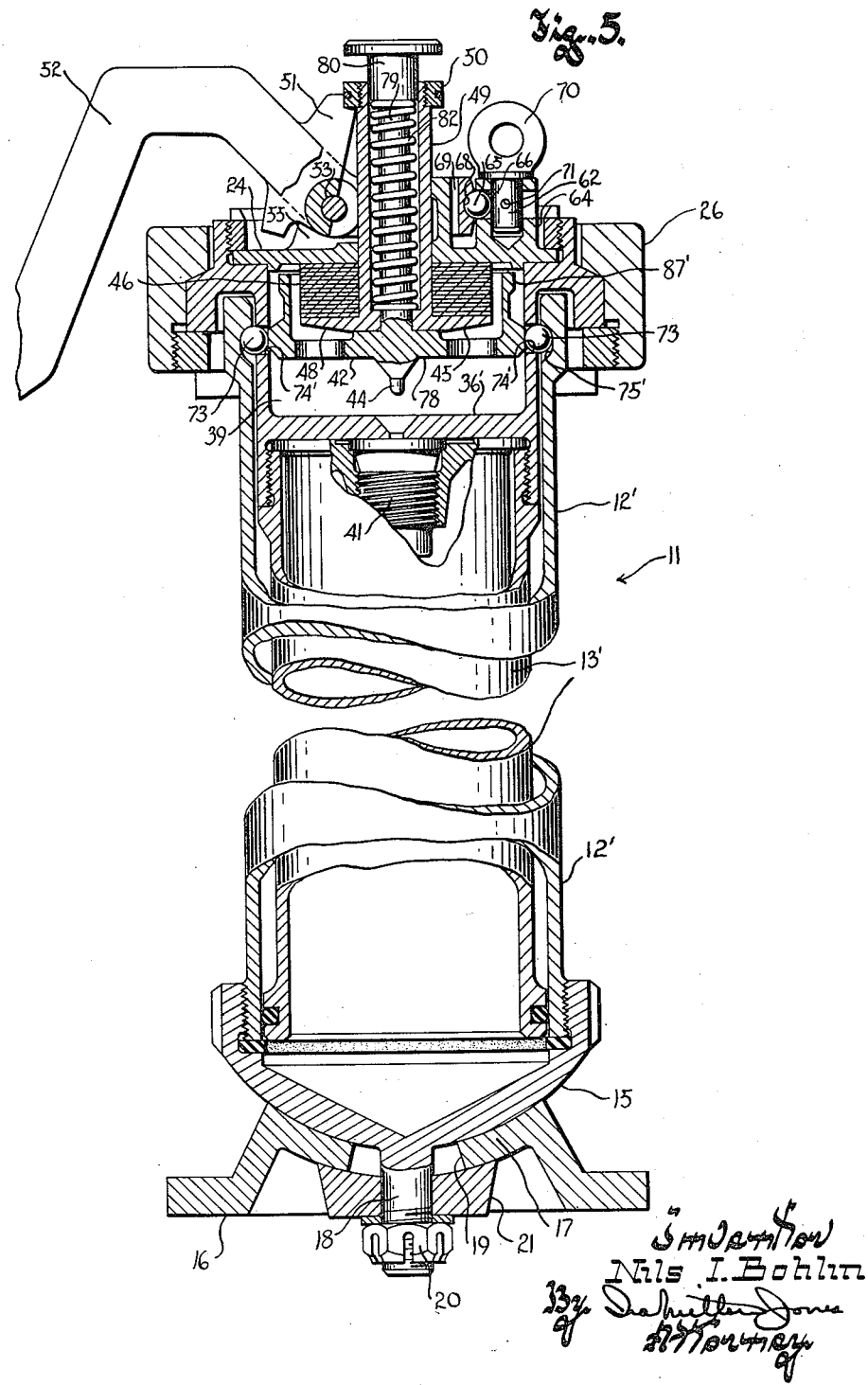

United States Patent Office 2,951,420
Patented Sept. 6, 1960

2,951,420

EJECTION GUN FOR AIRCRAFT EJECTION SEAT

Nils I. Bohlin, Linkoping, Sweden, assignor to Svenska Aeroplan Aktiebolaget, Linkoping, Sweden, a corporation of Sweden Filed Oct. 12, 1956, Ser. No. 615,537

Claims priority, application Sweden Oct. 13, 1955

5 Claims. (Cl. 89—1)

This invention relates to aircraft ejection seats, and refers more particularly to an ejection gun for propelling an airman's seat out of an airplane in the event of an emergency which necessitates abandonment of the aircraft in flight.

As is well known, the speed of modern high performance airplanes creates serious problems when emergency escape from such aircraft becomes necessary in flight; and to overcome these problems mechanical devices are employed which assist the crew to leave the airplane in an emergency. If an airman left such an airplane simply by jumping from it, his body would immediately be subjected to the force of the air blast created by forward motion of the plane, by which he might be violently thrown against the tail surfaces or other parts of the ship.

It has therefore become conventional to provide so-called ejection seats for crew members of high speed aircraft, and particularly in military airplanes. With such a mechanism, the airman confronted with the need for leaving an airplane in flight actuates an emergency control, and thereupon mechanism in the airplane propels his seat through a hatch or canopy opening, literally throwing the flier clear of the ship. The airman is of course strapped to the seat, and is provided with a parachute which is also secured to his person. In some instances floatation gear and an emergency oxygen supply accompany the airman out of the distressed airplane.

Obviously a very substantial force is required to propel the airman, his seat, and the accompanying emergency equipment out of the plane, and ejection of the seat must be positive and certain. Such forcible ejection of the seat is usually provided for by means of a so-called ejection gun, comprising a pair of elongated members, one of which is fixed in the airplane and the other of which carries the seat. Normally these two elongated members are disposed in telescoped relation, but when the mechanism for seat ejection is actuated a charge of powder housed in the members is exploded, generating pressure which axially separates the elongated members and propels the seat carrying member out of the airplane.

It is an object of the present invention to provide a seat ejection gun of the character described comprising a pair of elongated members, one of which is a cylinder and the other a piston or ram, and one of which has a seat secured thereto while the other is fixed in an airplane, which seat ejection gun incorporates certain important safety features, and, in particular, includes means for locking the ram and cylinder in normal telescoped relationship, such means providing for unlocking of the two telescoped members just before a propulsive powder charge is properly exploded to eject the seat or when the locking means is deliberately released manually for the purpose of disassembling the gun without detonating the powder charge.

More specifically, it is an object of this invention to provide an ejection gun of the character described wherein the piston and cylinder comprising the gun are normally locked in telescoped relationship by locking means held in engagement with both of them by a retainer; and wherein said retainer is carried by a hammer adapted to detonate a powder charge, so that movement of the hammer toward the powder charge carries the retainer out of engagement with the locking means, thereby releasing the latter and thus freeing the telescoped members for relative axial motion, which is created by the expanding gases generated by the exploding powder charge.

Still another object of this invention resides in the provision of an auxiliary retainer for the locking means, likewise constrained to movement with the hammer, whereby the locking means is retained in engagement with the telescoped members in the event of a misfire, even though the hammer has been moved toward the powder charge, thus preventing release of the seat from the airplane under such conditions; but which auxiliary retainer yieldably permits release of the locking means when the powder charge is properly detonated.

It is a further object of this invention to provide a seat ejection gun of the character described wherein disassembly of the normally telescoped members comprising the gun may be accomplished without detonation of the powder charge (to permit inspection of the device or removal of the seat from an airplane) merely by manual depression of a plunger-like member against the biasing force of a compression spring reacting against the same.

It is also an object of this invention to provide an ejection gun of the character described wherein the features set forth in the preceding statements of objects are embodied in a relatively simple and rugged structure which will assure dependable operation of the mechanism.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 2 is a perspective view of the upper portion of the ejection gun of this invention portions being cut away and shown in section;

Figure 3 is a longitudinal sectional view of the upper portion of the seat ejection gun shown in Figure 2, with the mechanism shown in its normal or cocked position;

Figure 4 is a sectional view similar to Figure 3 but with the firing mechanism shown in its released or detonating position and the ejection gun in a partly ejected position; and Figure 5 is a view partly in side elevation and partly in longitudinal section of a modified embodiment of the ejection gun of this invention.

Figure 1:
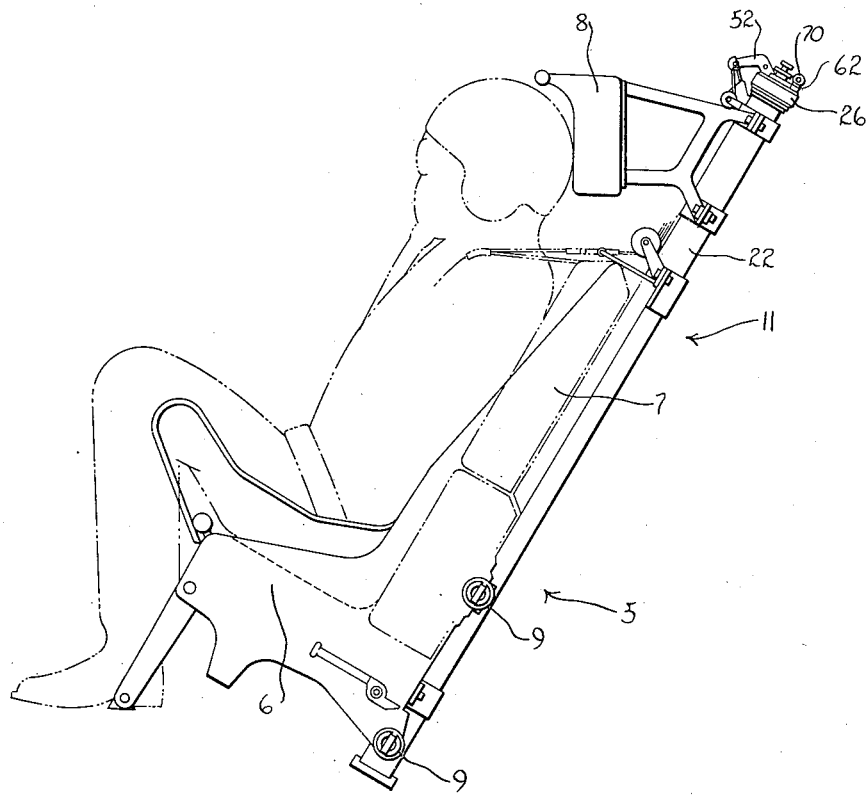
Figure 1 is a side elevational view of an airplane ejection seat incorporating an ejection gun embodying the principles of this invention.

Referring now more particularly to the accompanying drawings, in which like numerals designate like parts throughout the several views, the numeral 5 designates generally an ejection seat for an airman (an occupant of the seat being indicated in dotted lines in Figure 1), comprising generally a pan-like seat portion 6, a back support 7 and a head rest 8. Rollers 9 on the seat cooperate with guide rails (not shown) fixed to the airplane structure to "aim" the seat in a predetermined direction of ejection, all as more particularly disclosed in my copending application, Serial No. 611,975 filed September 25, 1956, now U.S. Patent Serial No. 2,879,715.

The mechanism for ejection of the seat comprises a so-called ejection gun, designated generally by 11, and consisting of a pair of elongated, normally telescoped members 12 and 13, one of which (designated by the numeral 12) is anchored to the fixed structure of the airplane, and the other of which carries the seat. The two elongated members comprising the ejection gun are a cylinder and a ram or piston; and for the purposes of this invention it is immaterial which of the two is fixed in the airplane and which carries the seat. In the embodiment of the invention illustrated in Figures 2 to 4, inclusive, the seat is attached to the cylinder 13 and the piston or ram 12 is secured to the fixed structure of the airplane, while in the embodiment of the invention shown in Figure 5 the relationship of these two members is reversed, that is, the cylinder 12' is anchored to the fixed airplane structure and the piston or ram 13' carries the seat.

Referring first to the embodiment of the invention shown in Figures 2 through 4, the piston or ram 12 is concentrically surrounded by the cylinder 13 and is tubular but has its lower end closed by a spherical bottom wall 15. Fixed to the airplane structure in any suitable manner is an attachment fitting 16 having a concave socket-like portion 17 in which the spherical bottom wall of the piston 12 is pivotally received. A coaxial stud 18 extending downwardly from the bottom wall of the piston through a substantially larger diameter hole 19 in the concave portion of the attachment fitting has a nut 20 threaded on its lower end; and interposed between this nut and the securement member is a cup-shaped washer 21. As will be readily apparent from Figure 4, the structure just described anchors the piston 12 against axial movement relative to the airplane but permits it to swing in any direction to a limited extend, so that the piston can align itself with the cylinder 13 and its connection to the ejectable seat.

The cylinder 13 comprises a tubular outer wall 22, a coaxial tubular inner wall 23 which projects downwardly into the interior of the tubular piston 12, and a cover 24 which closes the upper end of the cylinder. More specifically, the inner wall 23 of the cylinder has a radially outwardly projecting flange 25 at its upper end which overlies the top edge of the outer tubular cylinder wall. The cover 24 overlies this flange, and a flange nut 26, threadedly engaged with the upper portion of the outer cylinder wall as at 28 clamps the cover and the flange on the inner cylinder wall into engagement with one another and with the upper edge of the outer cylinder wall.

Sealing rings 30 and 31, respectively confined between the flange 25 and the upper end of the outer cylinder wall and between the flange 25 and the cover, render the upper end of the cylinder gas tight; while another sealing ring 33 engaged between the upper end of the piston and the inner face of the outer cylinder wall provides a gas tight seal between the cylinder and piston. A locking plate 35, confined in aligned notches in the cover, the flange 25 on the inner cylinder wall, the outer cylinder wall, and the flange nut, prevents relative rotation between those members.

A lateral partition 36 across the inner cylinder wall, spaced below the cover, divides the interior of the cylinder into a combustion chamber 37, below the partition, adapted to contain a charge of explosive powder 38, and a housing 39 for firing mechanism by which the powder charge in the combustion chamber may be detonated to effect seat ejecting axial separation of the telescoped cylinder and piston. The partition also provides a mounting support for a priming screw or detonator 41 which projects downwardly therethrough into the combustion chamber and has its head accessible to the firing mechanism.

In general the firing mechanism comprises a hammer 42 having a coaxial firing pin 44 projecting downwardly therefrom to engage the detonator 41, a driver 45 which carries the hammer and which is axially slidably mounted in the cover for movement between a normal or cocked position shown in Figure 2 and a released or detonating position shown in Figure 4, and which is biased toward its detonating position by a compression spring 46.

The driver comprises a substantially disc-like body 48 having a coaxial tubular stem 49 projecting upwardly therefrom and which is axially slidably mounted in a coaxial bore in the cover. The compression spring 46 surrounds the tubular stem portion of the driver and reacts between the underside of the cover and the body portion of the driver to urge the driver downwardly toward its detonating position.

A collar 50 secured to the upper end of the tubular stem portion of the driver provides a downwardly facing abutment under which a latch 51 is releasably engageable to normally maintain the driver in its cocked position. The latch may be swung to and from the position in which it is engaged under the collar 50 by means of an actuating arm 52 on one end of which the latch is rigidly secured and which is pivotally mounted on a pin 53 carried by lugs 55 projecting upwardly from the top of the cover. An airman occupying the seat may actuate the arm 52 by means of a flexible cable 56 accessible to him and having one end anchored to the cylinder as at 57. This cable is trained over a guide pulley 58 rotatably mounted on a bracket 59 fixed on the exterior of the cylinder and over a second pulley 60 mounted on the end of the actuating arm 52 remote from the latch. The cable 56 and pulleys 58 and 60 are so arranged that when the cable is pulled, the cable tends to swing the actuating arm downwardly, in the direction to carry the latch 51 out from under the collar 50, freeing the driver for abrupt motion to its detonating position under the bias of compression spring 46. An auxiliary release cable 56', connected similarly to cable 56, may have its free end accessible to the airman at another location.

To prevent inadvertent release of the latch mechanism, there is provided a safety device consisting of a safety pin 62 which is axially slidably engaged in an upwardly opening well in a boss 64 on the top of the cover. This safety pin normally retains a ball 65 in a short transverse bore 66 in the boss and in engagement with a notch 68 in an extension 69 of the actuating arm 52, so that while the safety pin and ball are in place, the ball locks the actuating arm against swinging motion. The safety pin is provided with a ring 70 by which it may be readily withdrawn, and upon such withdrawal of the safety pin the ball 65 falls out of engagement with the arm extension, freeing the arm for latch releasing actuation. The boss 64 and the safety pin 62 may be provided with small transverse bores 71 which align with one another in the normal position of the safety pin and through which a readily frangible shear pin or the like may be engaged to prevent inadvertent withdrawal of the safety pin.

The hammer has a substantially disc-like or cylindrical body 78 from which a coaxial stem 79 projects upwardly, through a hole in the body portion of the driver. At its upper end the stem of the hammer has a cylindrical enlargement 80, the diameter of which is substantially equal to the inside diameter of the tubular driver stem, so that the hammer is carried by the driver in a manner permitting the hammer to move axially relative to the driver. However, the hammer is biased upwardly and its body is normally held in engagement with the under side of the driver body by means of a coiled compression spring 82 surrounding the stem portion of the hammer and reacting between the body of the driver and the downwardly facing circumferential shoulder provided by the cylindrical enlargement at the upper end of the hammer stem. The hammer is thus normally maintained in a cocked position with the driver, but upon release of the latch, the hammer is of course carried downwardly with the driver to bring the firing pin 44 into detonating engagement with the detonator 41. The firing pin is guided into striking engagement with the detonator by means of a washer 84 threaded into the partition 36 above the firing pin and through the hole in which the firing pin projects in its detonating position.

The telescoping ejection gun members are normally secured in telescoped relationship with one another by locking means comprising a plurality of balls 73, each of which is normally held seated on an abutment provided by a port-like aperture 74 in the inner tubular wall of the cylinder and in engagement with an oblique, downwardly facing shoulder on the piston provided by a radially inwardly projecting flange 75 at its upper end. So long as the balls remain in engagement with these abutments on the two elongated members, the latter are locked against axial movement out of telescoped relationship; and the balls are normally held in such engagement with the cylinder and piston by means of a retainer 76 which is constrained to move with the hammer and which preferably comprises the peripheral portion of the hammer body. When the hammer moves downwardly with the driver, the retainer 76 moves out of engagement with the balls 73, permitting the balls to be displaced from locking engagement with the abutments in the cylinder and piston so that the telescoped members are freed for axial separation in response to the pressure generated by the exploding powder charge.

However, the balls may also be released from their locking engagement with the telescoped members without detonation of the powder charge, to permit disassembly of the ejection gun, and for this purpose the upper end of the stem portion of the hammer normally projects a substantial distance above the tubular stem portion of the driver to be accessible for manual depression, against the bias of the compression spring 82.

In the event of a misfire of the powder charge, the balls 73 are maintained in locking engagement with the cylinder and piston by means of an auxiliary retainer 86 comprising a substantially cup-like member, the base of which is interposed between the body portion 48 of the driver and the compresison spring 46, and the walls of which are notched to provide a plurality of spring fingers 87 curved upwardly and outwardly so that their free outer end portions are spaced above the body of the hammer and the retainer 76. As may be seen from Figure 4, the spring fingers engage the balls when the driver is in its detonating position, tending to hold the balls in locking relationship with the cylinder and piston; but if the force of the exploding powder charge is sufficient to eject the seat from the airplane, the camming action of the oblique undersurface of the flange 75 on the piston will drive the balls inwardly against the bias of the spring fingers 87 and thus permit axial separation of the telescoped members.

In the modified embodiment of the invention shown in Figure 5, the cylinder 12' is anchored to the airplane structure in the same manner as the piston 12 in the previously described embodiment. The transverse partition 36', which supports the detonator 41, closes the upper end of the piston 13', and the piston carries the powder charge 38 and the firing mechanism which is generally similar to that described above.

In the Figure 5 embodiment of the invention the abutments on the cylinder and piston with which the balls 73 engage to lock them against axial displacement comprise port-like apertures 74' in the wall of the piston and a circumferential groove 75' in the inner surface of the cylinder wall and which is radially aligned with the apertures 74' when the cylinder and piston are disposed in normal telescoped relationship. In other respects the structure of this embodiment is the same as that previously described, except that the auxiliary retainer comprises a readily deformable flange 87' integral with the retainer and spaced thereabove. The deformability of this flange permits the balls to be cammed out of the groove 75' when sufficient axial separating force is exerted upon the cylinder and piston by a properly exploding powder charge.

From the foregoing description taken together with the accompanying drawings it will be apparent that this invention provides a so-called ejection gun for propelling an ejection seat out of an airplane, in which ejection gun the relatively fixed and movable members comprising the gun are normally locked in telescoped relationship, unlocking of the members being effected by the actuation of the hammer whereby the powder charge is detonated, or by manual actuation of a plunger without detonating the powder charge. It will also be apparent that the ejection gun of this invention provides a safety feature whereby the telescoped members will remain locked together in the eevnt of a misfire of the powder charge, and that the structure which incorporates these advantageous features is a simple and rugged one which makes for dependable operation.

What is claimed as my invention is:

1. In an ejection gun of the type comprising a pair of telescoping elongated members, one of which is adapted to be fixed in an airplane and the other of which may be secured to a device adapted to be expelled from the airplane, said other elongated member being forcefully propellable out of telescoped relationship with the first in consequence of detonation of an exploded charge which the elongated members cooperate to confine when telescoped: a driver; driver mounting means on one of said elongated members mounting the driver for movement from a cocked to a detonating position; spring means reacting between said driver mounting means and the driver to bias the driver toward its detonating position; movable latch means carried by said one elongated member for releasably holding the driver in its cocked position against its biasing force; a firing pin mounted for movement relative to the driver in directions parallel to those of driver movement, to an extended position and a retracted position; cooperating abutments on the driver and the firing pin, engaged when the firing pin is in its retracted position relative to the driver to provide a unidirectional driving connection between the driver and the firing pin whereby the firing pin is constrained to move with the driver as the latter moves toward its detonating position but whereby the firing pin is able to move toward its extended position independently of the driver; yieldable means for holding the firing pin in its retracted position; locking means readily displaceably engaged with both of said elongated members to retain them in telescoped relationship; a retainer releasably engageable with said locking means to prevent displacement of the same out of engagement with both of said elongated members; and means providing a fixed connection between the retainer and the firing pin whereby the retainer is constrained to move with the firing pin and whreby the retainer is engaged with the locking means when the firing pin is in its retracted position and the driver is in its cocked position.

2. The ejection gun of claim 1, further characterized by manual actuator means accessible at the exterior of the elongated members, means connecting said manual actuator means with the firing pin so that the latter may be manually moved to its extended position relative to the driver, and thereby move the retainer out of its position of engagement with the locking means without effecting movement of the driver out of its cocked position.

3. In an ejection gun of the type comprising a pair of normally telescoped tubular members, one of which members is adapted to be fixed in an airplane in a substantially upright position and the other of which may have an ejectable device secured to it for expulsion out of the airplane in consequence of detonation of an explosive charge normally confined between the telescoped members and by explosion of which the tubular members are urged axially in opposite directions: means on the tubular members defining cooperating abutments that face in axially opposite directions; a plurality of balls readily displaceably confined between said abutments on the tubular members to lock the tubular members against axial displacement out of telescoped relationship; a driver having a tubular stem; means on one of the telescoped tubular members mounting the driver for axial movement, the driver having a radially projecting flange; spring means biasing the driver axially inwardly toward a detonating position; manually actuatable latch means carried by said telescoped tubular member, said latch means being releasably engageable with the driver to hold the driver in a normal position from which, upon release of the latch means, the driver is abruptly moveable inwardly toward its detonating position in response to the bias of the spring means; a hammer having a stem portion axially slidable in the tubular stem of the driver and a body portion inwardly of the flange on the driver and which is engageable with the flange of the driver to constrain the hammer to inward motion with the driver, said hammer also having a detonating pin for effecting detonation of an explosive charge confined between the telescoped members upon driver propelled inward motion of the hammer; spring means reacting between the hammer and the driver to normally hold the body portion of the hammer engaged with the flange on the driver; a retainer fixed on the hammer and engaging the balls when the driver is in its normal position and the body portion of the hammer is engaged with the flange on the driver, to hold the balls engaged with said abutments on the tubular members, said retainer being disengageable from the balls to permit displacement of the balls off of said abutments when the hammer is carried inwardly with the driver upon release of the latch means; and a manual actuator on the stem portion of the hammer, projecting outside the tubular stem of the driver, for manually moving the hammer inwardly to disengage the retainer from the balls without releasing the latch means.

4. An ejection gun for an aircraft carried device, comprising a pair of elongated members adapted to be normally disposed in telescoping relationship, one of which is adapted to be fixed in an airplane, while the other carries a device adapted to be expelled from the airplane, a hammer member, and means on one of the elongated members mounting the hammer member for spring propelled motion relative to said elongated member from a normal position to a detonating position for detonating an explosive charge normally confined in the members to propel them apart: characterized by releasable locking means comprising a movable part readily displaceably engaged with both of said elongated members to hold them against axial separation; and further characterized by a retainer fixed to the hammer member for motion in unison therewith and which is engaged with said releasable locking means in the normal position of the hammer member to hold the locking means engaged with both of said elongated members, and which retainer is carried out of engagement with the locking means along with the hammer member as the latter moves to its detonating position, so that disengagement of the locking means from at least one of the elongated members can occur in consequence of movement of the hammer member from its normal to its detonating position, whether or not detonation occurs.

5. In an ejection gun of the type comprising a pair of telescoping members, one of which is adapted to be fixed to an airplane, and the other of which may be fixed to a device adapted to be expelled from the airplane, said two telescoping members being forcefully propellable axially out of telescoped relationship in consequence of detonation of an explosive charge which they cooperate to confine when telescoped: a hammer; means on one of the telescoping members mounting the hammer for movement from a normal position to a detonating position; spring means biasing the hammer toward its detonating position; latch means movably carried by said one telescoping member for releasably holding the hammer in its normal position, in which said spring means exerts substantial biasing force on the hammer, and from which position the hammer, when released, may be spring propelled abruptly to its detonating position, in which it effects detonation of an explosive charge confined by the telescoping members; readily displaceable locking means normally engaged with both of the telescoping members to prevent relative separating motion between them; a retainer releasably engaged with said locking means to preclude displacement of said locking means; and means providing a rigid connection between the retainer and the hammer, constraining the hammer and retainer to move in unison, whereby the retainer is held engaged with said locking means when the hammer is in its nomal position and whereby movement of the hammer out of its normal position carries the retainer out of engagement with the locking means to release the telescoping members for relative separation whether or not the hammer effects detonation of an explosive charge.

References Cited in the file of this patent

UNITED STATES PATENTS

| | | |
|---|---|---|
| 2,421,807 | Richey et al. | June 10, 1947 |
| 2,516,902 | Musser | Aug. 1, 1950 |
| 2,527,020 | Martin | Oct. 24, 1950 |
| 2,726,576 | Musser | Dec. 13, 1955 |

FOREIGN PATENTS

| | | |
|---|---|---|
| 705,511 | Great Britain | Mar. 17, 1954 |